(12) United States Patent
Domagalski et al.

(10) Patent No.: US 8,603,374 B2
(45) Date of Patent: Dec. 10, 2013

(54) PROCESSES FOR PRODUCING A POLYMER-BONDED FIBER AGGLOMERATE AND A FIBER-REINFORCED COMPOSITE MATERIAL

(75) Inventors: Peter Domagalski, Westendorf (DE); Alfred Haeusler, Meitingen (DE); Ingrid Kraetschmer, Biberbach (DE); Andreas Kienzle, Moettingen Ot Balgheim (DE); Dieter Wuestner, Augsburg (DE)

(73) Assignee: SGL Carbon SE, Wiesbaden (DE)

( * ) Notice: Subject to any disclaimer, the term of this patent is extended or adjusted under 35 U.S.C. 154(b) by 19 days.

(21) Appl. No.: 13/226,893

(22) Filed: Sep. 7, 2011

(65) Prior Publication Data

US 2011/0316179 A1 Dec. 29, 2011

Related U.S. Application Data

(62) Division of application No. 11/247,545, filed on Oct. 11, 2005, now abandoned.

(30) Foreign Application Priority Data

Oct. 8, 2004 (EP) .................... 04024014

(51) Int. Cl.
*B05D 3/02* (2006.01)
*C01B 31/00* (2006.01)

(52) U.S. Cl.
USPC ....... 264/29.2; 264/29.3; 264/29.5; 264/29.7; 264/109; 428/375

(58) Field of Classification Search
USPC .......... 264/29.1–3, 29.5, 29.7, 118, 136, 109; 428/375
See application file for complete search history.

(56) References Cited

U.S. PATENT DOCUMENTS

| 4,364,993 | A | * | 12/1982 | Edelman et al. | ........... 428/298.7 |
|---|---|---|---|---|---|
| 4,559,262 | A | | 12/1985 | Cogswell et al. | |
| 4,886,684 | A | | 12/1989 | Schnell et al. | |
| 5,532,054 | A | | 7/1996 | Koba et al. | |
| 5,869,411 | A | | 2/1999 | Bazshushtari et al. | |
| 6,086,353 | A | * | 7/2000 | Klaus | .............. 425/145 |
| 6,410,126 | B1 | | 6/2002 | Guevel et al. | |
| 6,432,536 | B1 | * | 8/2002 | Hecht et al. | ................... 428/408 |
| 6,579,396 | B2 | | 6/2003 | Erb, Jr. | |
| 7,468,514 | B1 | * | 12/2008 | Suzuki et al. | ............ 250/370.09 |
| 8,083,976 | B2 | * | 12/2011 | Lengsfeld et al. | ............ 264/112 |
| 2003/0169757 | A1 | * | 9/2003 | LaVigne et al. | ............... 370/413 |
| 2004/0126535 | A1 | | 7/2004 | Sommer et al. | |
| 2006/0076699 | A1 | | 4/2006 | Domagalski et al. | |
| 2009/0238966 | A1 | * | 9/2009 | La Forest et al. | ........... 427/228 |
| 2011/0254182 | A1 | * | 10/2011 | La Forest et al. | ........... 264/29.5 |
| 2011/0286910 | A1 | * | 11/2011 | Lee et al. | ................. 423/445 R |

FOREIGN PATENT DOCUMENTS

| DE | 2103908 | A1 | 8/1972 |
|---|---|---|---|
| EP | 0530741 | A1 | 3/1993 |
| EP | 0303098 | B1 | 11/1994 |
| EP | 0530741 | B1 | 11/1996 |
| EP | 1074653 | A2 | 2/2001 |
| JP | 04034060 | A | 2/1992 |
| JP | 2000143826 | A | 5/2000 |
| JP | 2002294542 | A | 10/2002 |

OTHER PUBLICATIONS

Sigrafil C: "The PAN-Based Carbon Fiber", Mar. 2007, pp. 1-8, SGL Carbon Group, Leatherhead, United Kingdom.

* cited by examiner

*Primary Examiner* — Joseph S Del Sole
*Assistant Examiner* — Nahida Sultana
(74) *Attorney, Agent, or Firm* — Laurence A. Greenberg; Werner H. Stemer; Ralph E. Locher

(57) ABSTRACT

A polymer-bonded fiber agglomerate includes short fibers selected from carbon, ceramic materials, glasses, metals and organic polymers, and a polymeric bonding resin selected from synthetic resins and thermoplastics. The fiber agglomerates have an average length, measured in the fiber direction, of from 3 mm to 50 mm and an average thickness, measured perpendicularly to the fiber direction, of from 0.1 mm to 10 mm. At least 75% of all of the contained fibers have a length which is at least 90% and not more than 110% of the fiber agglomerate average length. A fiber-reinforced composite material having the fiber agglomerate and processes for the production thereof are also provided.

19 Claims, No Drawings

PROCESSES FOR PRODUCING A POLYMER-BONDED FIBER AGGLOMERATE AND A FIBER-REINFORCED COMPOSITE MATERIAL

CROSS-REFERENCE TO RELATED APPLICATION

This is a divisional application of application Ser. No. 11/247,545, filed Oct. 11, 2005; the application also claims the priority, under 35 U.S.C. §119, of European patent application No. EP 04 024 014.5, filed Oct. 8, 2004; the prior applications are herewith incorporated by reference in their entirety.

BACKGROUND OF THE INVENTION

Field of the Invention

The invention relates to polymer-bonded fiber agglomerates, fiber-reinforced composite materials and processes for the production thereof.

In the production of fiber composite materials, reinforcing fibers are usually employed in the form of continuous fibers (filaments and filament yarns), short fibers, short fiber bundles, or in the form of sheet-like structures (e.g. as woven fabric, knitted fabric, loop-knit fabric, or non-wovens).

While defined orientations of the filaments are aimed for in the processing of filaments and filament yarns as well as the processing of sheet-like structures (filament winding, laying of resin-impregnated or thermoplastic-impregnated woven fabrics or felts or other sheet-like structures in molds with shaping and curing), the materials reinforced with short fibers conventionally have an orientation influenced by the processing method (alignment of the short fibers by flowing in the mold during injection molding or pressing) and a fiber length distribution determined by the production of the material (for example in the production of fiber-reinforced thermoplastics by drawing in rovings, that is to say filament bundles, in a mixing kneader or an extruder).

The mechanical properties of fiber-reinforced materials are also a function of the fiber length and of the fiber length distribution.

In the production of materials reinforced with short fibers, a controlled choice of the fiber length and the distribution thereof was not easily possible heretofore. A spectrum of the length distribution and of the width distribution of the bundles can be established in a controlled manner by using sieve fractions of ground fibers or fiber bundles, for example. However, the use of fractions having fiber lengths unsuitable for the intended purpose presents problems, and in some circumstances unsuitable fractions must be discarded, or the fibers only incompletely fulfill their intended reinforcing effect.

SUMMARY OF THE INVENTION

It is accordingly an object of the invention to provide a polymer-bonded fiber agglomerate, a fiber-reinforced composite material and processes for producing the same, which overcome the hereinafore-mentioned disadvantages of the heretofore-known products and processes of this general type and with which short fiber agglomerates having an adjustable fiber length and a length distribution that is as sharp as possible and can be selected, can be produced in a controlled manner. The average number of fibers contained in an agglomerate is also of importance for the production of short fiber agglomerates, and this "agglomerate thickness" should also be reproducibly adjustable in a controllable production process.

With the foregoing and other objects in view there is provided, in accordance with the invention, a polymer-bonded fiber agglomerate. The fiber agglomerate comprises short fibers selected from the group consisting of carbon, ceramic materials, glasses, metals and organic polymers, and a polymeric bonding resin selected from the group consisting of synthetic resins (thermosetting resins) and thermoplastics. A fiber agglomerate average length, measured in a fiber direction, is from 3 mm to 50 mm. A fiber agglomerate average thickness, measured perpendicularly to the fiber direction, is from 0.1 mm to 10 mm. At least 75% of all contained fibers have a length being at least 90% and at most 110% of the fiber agglomerate average length.

With the objects of the invention in view, there is also provided a process for producing a polymer-bonded fiber agglomerate having fiber pieces and a polymer chosen from synthetic resins and thermoplastics. The process comprises soaking a filament yarn with a liquid or pulverulent synthetic resin or a liquid or pulverulent thermoplastic to form an impregnated filament strand. The impregnated filament strand is pressed or flattened to a laid material of filaments orientated in parallel. If a synthetic resin is used, the synthetic resin is cured by heat treatment. The pressed filament strand is cooled. The filament strand is cut to a defined width and length.

In accordance with another mode of the invention, preferably at least one of the process steps is, and particularly preferably all of the process steps mentioned are, carried out continuously.

The invention also relates to the use of the polymer-bonded fiber agglomerates produced according to the invention from short fibers, for the production of components of materials reinforced with short fibers, in particular ceramic materials reinforced with short fibers.

With the objects of the invention in view, there is additionally provided a fiber-reinforced composite material, comprising fiber agglomerates having a fiber agglomerate average length, measured in a fiber direction, of from 3 mm to 50 mm, and a fiber agglomerate average thickness, measured perpendicularly to the fiber direction, of from 0.1 mm to 10 mm. At least 75% of all contained fibers have a length being at least 90% and at most 110% of the fiber agglomerate average length.

In accordance with a further mode of the invention, the polymer-bonded filament strands flattened to a tape, where the filaments employed are those of carbon, high-melting-point metals or ceramic materials, are carbonized before the cutting by a heat treatment to the exclusion of oxidizing substances at temperatures of preferably above 800° C., and the bonding resin is converted into carbon. Thereafter, an additional step in which the carbonized tape is coated with a pitch can preferably follow, after which the tape coated with pitch can also be carbonized again, with the pitch being converted into carbon. As an alternative to this step or after this step, the carbonized tape can be coated with further pitch or carbonizable polymers by a screen printing process or roller application. It is possible for this coating composition to also include fillers, such as pulverulent ceramic materials or carbon powder or metal powder. Carbon powders and graphite powders, powders of silicon carbide and silicon nitride and boron carbide, as well as powders of silicon and alloys of silicon with other metals, such as iron, chromium, molybdenum and other carbide-forming elements, are preferred. Individual steps or all of the steps of this optional process can preferably be carried out continuously.

With the objects of the invention in view, there is concomitantly provided a process for the production of a fiber-reinforced ceramic composite material. The process comprises producing the polymer-bonded fiber agglomerate according to the above-mentioned steps and additionally mixing the fiber agglomerate with a carbonizable polymer. The mixture is formed under pressure and at elevated temperature to yield a shaped article. The shaped article is heated to the exclusion of oxidizing substances and a fiber-reinforced porous body having a matrix of carbon is formed. The porous carbon body is infiltrated with a melt of at least one carbide-forming element, and at least some of the carbon of the matrix is converted into carbides.

In this context, "carbonizable polymer" means a polymer which, upon heating to a temperature of at least 800° C. to the exclusion of oxidizing substances, forms a carbon residue, the weight of which is at least 20% of the weight of the polymer being employed.

Silicon is preferably employed as the carbide-forming element, or alloys of silicon with metals chosen from iron, nickel, cobalt, copper, chromium, molybdenum, vanadium, aluminum, manganese and tungsten.

Polymer-bonded fiber agglomerates which have a standard deviation of the length $s_L$ and of the width $s_W$ from the given set value for the length L and the width W of not more than $s_L$=0.1 * L and $s_W$=0.1 * W are preferred.

Polymer-bonded fiber agglomerates which are furthermore preferred are those which have a ratio of the length to the width of from 2:1 to 100:1, particularly preferably of from 4:1 to 50:1.

The thermoplastics and thermosetting resins employed as the bonding resin are chosen in such a way that the temperatures at which they are plastically processable are sufficiently far below the softening temperature of the filaments. Thus, for example, for bonding polyester filaments (polyethylene terephthalate) or polyamide filaments (PA 6 or PA 66), low-melting-point thermoplastics, such as polyamide 11 or polyamide 12 or ethylene/vinyl acetate copolymers, are employed, in addition to phenolic resins of low softening point. Filaments of gel-spun high-strength polyethylene can advantageously be bonded only with thermosetting resins that already cure at low temperatures. These precautions are, of course, less important for filaments of carbon, ceramic materials, glass or metals.

The process is preferably carried out in such a way that the number of fiber layers in the fiber agglomerates is at most three, preferably not greater than two, and particularly preferably close to one. This can be ensured by fanning out the filament strand before the impregnation or the soaking and by the choice of the pressing pressure. In this procedure, by blowing on with a gas, preferably a heated gas, the filament strand, which is not under tension in this case, is broken up into individual filaments, which are then guided side by side over a roller or a godet.

Before the soaking with the polymer, the filament strand is preferably freed from adhering size by washing and drying or by heat treatment. The filament strand is then led over a deflection roller into a bath with a solution or a melt of a synthetic resin or of a thermoplastic, or alternatively the filament strand which has been fanned out, for example by blowing on with compressed air, is led through a fluidized bed with synthetic resin powder or thermoplastic powder. The powders adhere particularly well to the filaments if the step of blowing on is carried out with a heated gas.

After the soaking or impregnation, the filament strand is led through a roller mill, a calender or a belt press or another suitable continuous pressing device. In this pressing device, the excess amount of polymers is preferably pressed out of the filament strand by several roller nips of decreasing inside width disposed in succession, and the strand is compressed to the extent that preferably only one fiber layer with filaments running substantially parallel is formed. The pressing is carried out in the hot state, and in this state a thermoplastic can still flow and thereby wets the filaments uniformly. A synthetic resin already starts to cure during this hot pressing, and the heating zone is therefore to be coordinated to the particular material.

The cooling of the now flat bonded filament strands can also preferably be carried out in roller nips. Upon leaving the roller mill or the belt press, a filament strand in the form of flat unidirectional tapes ("UD tapes") is present.

These tapes are now cut lengthwise to a desired width, preferably by a cutting roller or several cutting rollers disposed side by side. It is also possible to cut the tapes in the not yet completely cured state by wires tensioned in the tape path.

After leaving the longitudinal cutting device, in which the tapes are divided into a chosen width, the material passes into a length-cutting device, which also is preferably operated continuously. However, it is also possible to carry out the cutting into lengths in a separate process with a different tape speed. For this purpose, the tapes cut to the chosen width are wound up on bobbins and transported to the length-cutting device.

The continuous process for cutting the tapes into the desired length is preferably carried out with a blade roller.

The cut pieces of tape, i.e. the fiber agglomerates, are filled into suitable containers and passed on for further use.

Fiber agglomerates of defined width and length can be produced in a simple and reproducible manner by the process according to the invention. The amount of polymeric bonding agent remaining in the fiber agglomerates can be kept very low by pressing off the polymeric bonding agent and establishing thin layers, preferably single layers, that is to say fiber agglomerates of a height approximately corresponding to the diameter of an individual filament.

These fiber agglomerates of defined length and width can be employed as a pure variety or in a mixture of various lengths or widths for the production of materials reinforced with short fibers. It can be ensured, by a suitable choice of the polymeric bonding agent, that upon mixing of the fiber agglomerates with the matrix material or, in the case of ceramic materials, the precursors of the matrix material, the fiber agglomerates do not break up or do so only insignificantly. It can be ensured in this manner that the reinforcing fibers have a uniform length and strength. In the case of mixtures of different fiber agglomerates, the spectrum of their fiber length distribution or of the thickness distribution can likewise be adjusted in a controlled manner.

Fibers of high heat resistance, such as those of carbon or ceramic materials, are of course employed for reinforcing ceramic materials.

Other features which are considered as characteristic for the invention are set forth in the appended claims.

Although the invention is described herein as embodied in a polymer-bonded fiber agglomerate, a fiber-reinforced composite material and processes for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the following examples.

DESCRIPTION OF THE PREFERRED EMBODIMENTS

The following examples illustrate the advantageous properties of such materials of defined geometry (length and width and thickness) of the reinforcing fiber bundles.

Example

Referring now to the example in detail, it is noted that for the production of a filament tape which is 120 cm wide, 48 filament strands of SIGRAFIL® C30T060 EPY (manufacturer: SGL Technic Ltd.), which is a carbon fiber made from polyacrylonitrile (PAN) precursor fiber, were soaked in parallel with a phenolic resin (NORSOPHEN® PF N 1203, Cray Valley), which is Phenol-formaldehyde, through a film transfer process and then prestabilized thermally. The distance between the individual filament strands in this case was 10 mm. The resin-soaked filament strands were rolled up on cardboard cores with intermediate layers of paper.

In a following step, the filament webs were compacted to a defined thickness of 130 µm with the aid of a twin-belt press. The resin was simultaneously cured by heating up to 180° C. to dimensional stability of the filament tape. For this purpose, the thermally prestabilized filament tapes were introduced into the belt press through an unwinding station. During this procedure, the empty spaces between the filament tapes were filled by the filament/resin tapes flowing apart. A uniformly 130 µm thick, continuous filament sheet was thereby formed. Defined fiber agglomerates having a length of 12 mm and a width of 1.5 mm were cut out of this filament sheet with a cutting device.

500 g of these fiber agglomerates cut to a defined size were mixed with 300 g of phenolic resin (NORSOPHEN® PF N 1203) and 200 g of KS 6 graphite (natural graphite powder) in a mixer from the firm Eirich at a speed of rotation of 200 $min^{-1}$. After a mixing time of 5 minutes, the mixing vessel was emptied. A pressing mold having a cross-section of 160 mm×160 mm was filled with the pressing composition. The material in the filled mold was compacted to a density of 1.2 g/cm$^3$ and cured in a press from the firm Joos at a temperature of 180° C.

The pressed article obtained in this way was pyrolysed at 900° C. under a nitrogen atmosphere. After cooling, a porous C/C body (porous carbon reinforced with fibers of carbon) was obtained, and in the next step was infiltrated with liquid silicon at a temperature of 1,550° C. under a reduced pressure of approximately 10 hPa (10 mbar) through porous C/C wicks. The properties of the C/SiC material obtained in this way (the matrix contains silicon carbide, silicon and residues of unreacted carbon, the reinforcing fibers of carbon remain substantially unchanged) having a density of 2.3 g/cm$^3$ were distinguished by a high strength and high elongation at break values. A strength of from 110 MPa to 120 MPa at an elongation of from 0.3% to 0.4% was measured in the bending test.

The uniform distribution of the fiber lengths in the composite material thus has a favorable effect on the strength and elongation, while conventionally in composite materials a gain in strength can be achieved only at the expense of the elongation, and a drop in strength is the price of higher elongations.

Composite materials in which the reinforcing fibers had an average length of between 5 mm and 40 mm, preferably 8 mm to 30 mm and particularly preferably 10 mm to 25 mm, with at least 90% of the weight of the reinforcing fibers having a length of between 90% and 110% of the average fiber length, have proved to be particularly favorable in this context. Such a distribution of the fiber lengths is also called "defined fiber length" in this case. It has also proved to be favorable that the fiber agglomerate thickness is likewise defined, that is to say that at least 90% of all the contained fibers have a thickness which is between 90% and 110% of the fiber agglomerate average thickness. The fiber agglomerate average thickness in this case is preferably between 0.2 mm and 5 mm, particularly preferably between 0.5 mm and 4 mm, and in particular between 0.8 mm and 3 mm.

Short fiber agglomerates of such a narrow distribution having a defined length and thickness were not accessible by using the techniques available heretofore.

The invention claimed is:

1. A process for producing a polymer-bonded fiber agglomerate, the process comprising the following steps:
    soaking a filament yarn with a liquid or pulverulent synthetic resin or a liquid or pulverulent thermoplastic to form an impregnated filament strand;
    pressing the impregnated filament strand to a laid material of filaments orientated in parallel;
    optionally, curing the synthetic resin, if used by heat treatment;
    cooling the pressed filament strand;
    carbonizing the filament strand pressed to a tape by heating to the exclusion of oxidizing substances; and
    cutting the filament strand to a defined width and length,
    said cutting resulting in formation of the polymer-bonded fiber agglomerate formed of:
    fibers selected from the group consisting of carbon, ceramic materials, glasses, metals and organic polymers;
    a polymeric bonding resin selected from the group consisting of synthetic resins and thermoplastics;
    the fiber agglomerate having an average length, measured in a fiber direction, of from 3 mm to 50 mm;
    the fiber agglomerate having an average thickness, measured perpendicularly to said fiber direction, of from 0.1 mm to 10 mm; and
    at least 75% of all contained fibers in the agglomerate having a length being at least 90% and at most 110% of said fiber agglomerate average length.

2. The process according to claim 1, which further comprises carrying out at least one of the process steps continuously.

3. The process according to claim 1, which further comprises fanning out the filament strand by blowing on the filament strand with a gas before the soaking and impregnating step.

4. The process according to claim 1, which further comprises coating the carbonized tape with a pitch and thereafter carbonizing the tape again.

5. The process according to claim 1, which further comprises coating the carbonized tape with a carbonizable polymer or a pitch.

6. The process according to claim 5, which further comprises additionally applying fillers selected from the group consisting of carbon powders, ceramic powders and powders of carbide-forming elements, together with or after the coating with the carbonizable polymer or the pitch.

7. The process according to claim 1, which further comprises carrying out at least one of the steps continuously.

8. The process according to claim 5, which further comprises carrying out at least one of the steps continuously.

9. The process according to claim 6, which further comprises carrying out at least one of the steps continuously.

10. The process according to claim 1, which further comprises providing a ratio of fiber agglomerate length to width of from 2:1 to 100:1.

11. The process according to claim 1, which further comprises providing at most three fiber layers.

12. The process according to claim 1, which further comprises providing carbon fibers.

13. A process for the production of a fiber-reinforced ceramic composite material, which comprises the following steps:
   producing the polymer-bonded fiber agglomerate according to claim 1;
   mixing the fiber agglomerate with a carbonizable polymer;
   forming the mixture under pressure and at elevated temperature to yield a shaped article;
   heating the shaped article to the exclusion of oxidizing substances and forming a fiber-reinforced porous body having a matrix of carbon; and
   infiltrating the porous carbon body with a melt of at least one carbide-forming element, and converting at least some of the carbon of the matrix into carbides.

14. The process according to claim 13, which further comprises carbonizing the filament strand pressed to a tape by heating to the exclusion of oxidizing substances, before the cutting step.

15. The process according to claim 14, which further comprises coating the carbonized tape with a pitch and thereafter carbonizing the tape again.

16. The process according to claim 14, which further comprises coating the carbonized tape with a carbonizable polymer or a pitch.

17. The process according to claim 16, which further comprises additionally applying fillers selected from the group consisting of carbon powders, ceramic powders and powders of carbide-forming elements, together with or after the coating with the carbonizable polymer or the pitch.

18. A polymer-bonded fiber agglomerate, comprising:
   fibers selected from the group consisting of carbon, ceramic materials, glasses, metals and organic polymers;
   a polymeric bonding resin selected from the group consisting of synthetic resins and thermoplastics;
   a fiber agglomerate average length, measured in a fiber direction, of from 3 mm to 50 mm;
   a fiber agglomerate average thickness, measured perpendicularly to said fiber direction, of from 0.1 mm to 10 mm; and
   at least 75% of all contained fibers having a length being at least 90% and at most 110% of said fiber agglomerate average length.

19. A fiber-reinforced ceramic composite material, comprising:
   the polymer-bonded fiber agglomerate according to claim 1 produced by carrying out the following process steps:
   mixing the fiber agglomerate with a carbonizable polymer;
   forming the mixture under pressure and at elevated temperature to yield a shaped article;
   heating the shaped article to the exclusion of oxidizing substances and forming a fiber-reinforced porous body having a matrix of carbon; and
   infiltrating the porous carbon body with a melt of at least one carbide-forming element, and converting at least some of the carbon of the matrix into carbides.

* * * * *